United States Patent
Torno et al.

(10) Patent No.: US 7,080,629 B2
(45) Date of Patent: Jul. 25, 2006

(54) METHOD AND DEVICE FOR KNOCK CONTROL OF AN INTERNAL COMBUSTION ENGINE

(75) Inventors: Oskar Torno, Schwieberdingen (DE); Carsten Kluth, Stuttgart (DE); Werner Haeming, Neudenau (DE); Crina Vlad, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/877,186

(22) Filed: Jun. 24, 2004

(65) Prior Publication Data

US 2005/0005907 A1    Jan. 13, 2005

(30) Foreign Application Priority Data

Jul. 7, 2003    (DE) .................... 103 30 615

(51) Int. Cl.
*F02P 5/152*    (2006.01)

(52) U.S. Cl. .............................. 123/406.29

(58) Field of Classification Search ............ 123/406.29
See application file for complete search history.

(56) References Cited

U.S. PATENT DOCUMENTS

| 4,527,524 | A  | * | 7/1985  | Guipaud ................ 123/406.29 |
| 4,699,106 | A  | * | 10/1987 | Haraguchi et al. ..... 123/406.21 |
| 5,645,034 | A  | * | 7/1997  | Entenmann et al. ... 123/406.33 |
| 6,161,523 | A  | * | 12/2000 | Unland et al. ......... 123/406.23 |
| 6,247,448 | B1 | * | 6/2001  | Scholl et al. .......... 123/406.33 |
| 6,910,461 | B1 | * | 6/2005  | Tanei et al. ............ 123/406.29 |
| 2003/0029416 | A1 | * | 2/2003 | Sauler et al. .......... 123/406.29 |

* cited by examiner

*Primary Examiner*—Erick Solis
(74) *Attorney, Agent, or Firm*—Kenyon & Kenyon LLP

(57) ABSTRACT

A method and a device for knock control of an internal combustion engine, in which an adjustment of the ignition angle takes place. When knocking occurs, the ignition angle is retarded and then advanced again. An increasing advance adjustment of the ignition angle reduces the rate of the advance adjustment.

8 Claims, 2 Drawing Sheets

METHOD AND DEVICE FOR KNOCK CONTROL OF AN INTERNAL COMBUSTION ENGINE

BACKGROUND INFORMATION

A method for knock control of an internal combustion engine is described in German Patent Application No. DE 195 32 405, in which the ignition angle is retarded when a knock event occurs in the internal combustion engine. Afterwards, the ignition angle is advanced again at a constant rate.

SUMMARY OF THE INVENTION

The device according to the present invention and the method according to the present invention have the advantage over the related art that the ignition angle is initially advanced again more quickly after being retarded, and is advanced noticeably more slowly when approaching the knock limit. Thus, operation close to the knock limit is achieved at the same time, thereby achieving an improvement in efficiency and less occurrence of knocking, that is, less load on the internal combustion engine. The method according to the present invention thus has a much better control quality for knock control than the previously known method.

The adjustment of the ignition angle according to the present invention may be implemented quite easily by simply measuring the time since the last knock event occurred. The time measurement may involve counting the ignition events or monitoring a time counter. Furthermore, the rate of ignition advance may depend on the size of the interval between the current knock control retard adjustment and the knock limit. A further simple implementation of the ignition angle adjustment according to the present invention involves observing the size of the ignition angle knock portion and making the rate of adjustment dependent on the size of this ignition angle knock portion. It is in particular useful if not only the ignition angle base portion but the ignition angle knock portion as well is dependent on a load and rotational speed of the internal combustion engine. The method according to the present invention may be quite easily implemented for a gradual adjustment of the ignition angle.

DETAILED DESCRIPTION

Figure 1:
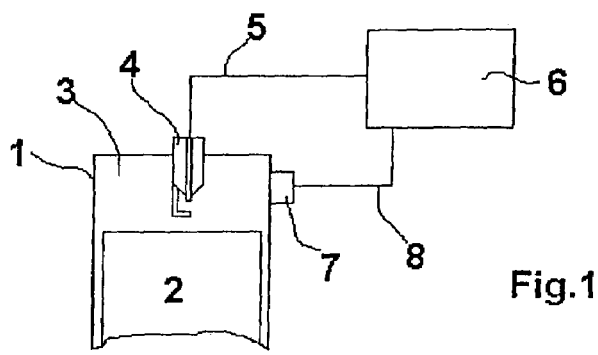
FIG. 1 shows an internal combustion engine and a corresponding control device.

FIG. 1 shows a cylinder of an internal combustion engine and a piston 2 positioned therein. Cylinder 1 and piston 2 form a combustion chamber 3, into which a spark plug 4 projects. Spark plug 4 is connected via a corresponding ignition control line 5 to an engine control unit 6 or an ignition coil, which is actuated by engine control unit 6. For purposes of simplification, the ignition coil is not shown here. Furthermore, also positioned on the exterior of cylinder 1 is a knock sensor 7, likewise connected to control unit 6 by a corresponding sensor signal line 8. An ignitable mixture of gasoline and air, which is ignited by spark plug 4, is introduced into combustion chamber 3 of the internal combustion engine. Piston 2 moves in the cylinder in such a way that, coming from below, it reaches the top dead center, and then starting again from the top dead center, moves down again. The ignition is normally triggered in cylinder 1 before the top dead center of piston 2. An ignition adjustment timed before the top dead center of piston 2 is referred to as an advanced ignition adjustment, while an ignition adjustment closer to the top dead center is referred to as a retarded ignition.

The earlier the ignition is triggered, the greater the tendency of the engine to knock. A knock event occurs when there is an abrupt combustion, which results in severe pressure peaks at individual points of combustion chamber 3. This may damage cylinder 1 as well as piston 2. However, operating the internal combustion engine is more economical the earlier the ignition is triggered before the top dead center. The objective of a knock control is therefore to facilitate the earliest possible ignition time without any knocking occurring in the process. This takes place by having the knock signals of knock sensor 7 evaluated by control unit 6. When knocking occurs, severe fluctuations in pressure take place, which may be detected either directly as fluctuations in pressure or as acoustic signals or vibrations. Correspondingly, a knock sensor may be designed as a pressure sensor, an acceleration sensor, or a microphone. Conventional knock control methods respond to knock events such that the ignition angle is immediately retarded in order to ensure a non-knocking combustion during the next combustion. Afterwards, the ignition angle is carefully advanced again in order to inch back toward an optimum advanced ignition angle. When knocking occurs, the ignition angle is normally noticeably adjusted and then advanced again at a lower rate. In conventional systems, the rate of this ignition advance is constant.

Figure 2:
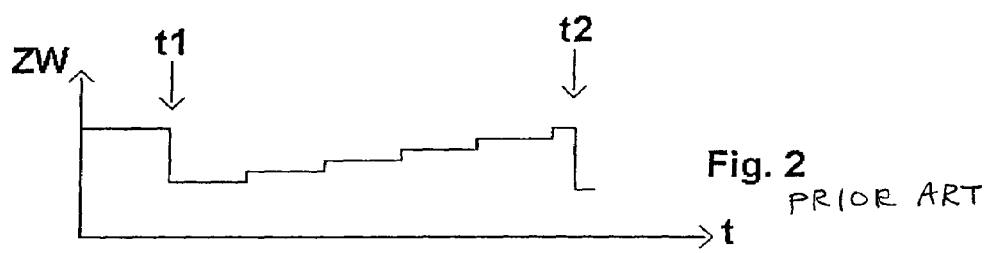
FIG. 2 shows a conventional determination of the ignition angle.

In FIG. 2, the ignition angle ZW plotted against time t is shown for a conventional knock control system. In this case, ignition angle axis ZW points upward in the advance direction. Time axis t is specified either directly in time units or in ignition events. Since ignitions run in chronological succession in an internal combustion engine and the ignition angles are always output corresponding to these ignition events, it is of no importance to the regulation of an ignition angle considered here whether axis t is a time unit or a number of ignition events. They may also be directly converted into one another as a function of the particular rotational speed of the internal combustion engine.

In FIG. 2, a knock event occurs at time t1, causing a severe retardation of the ignition angle. After this ignition event and the retardation, the ignition angle is advanced again in smaller steps until a further knock event occurs at time t2.

Figure 3:
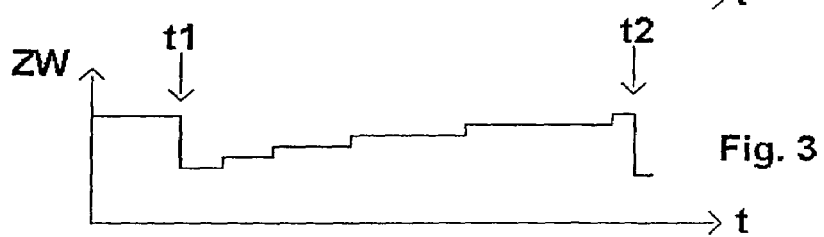
FIGS. 3 and 4 show two exemplary embodiments of the ignition angle adjustment according to the present invention.
Figure 4:
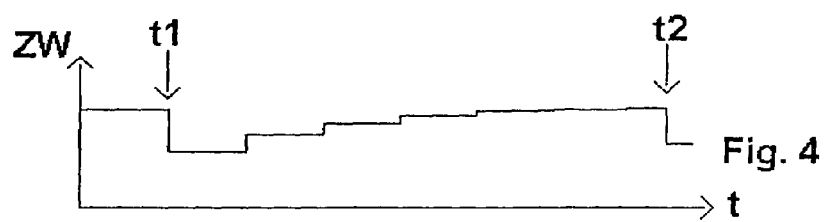

In the illustrations of FIGS. 2, 3 and 4, a completely static operating state is assumed, in which the knocking keeps occurring at the same advanced ignition angle value. In FIG. 2, the ignition angle advance takes place incrementally each time, the steps exhibiting the same step width (time width) and a constant step height (ignition angle adjustment is the same each time). Each of these steps corresponds to a plurality of ignitions, meaning that the ignition angle is kept constant after the retardation of the ignition angle on account of the knock event for a particular period of time or number of ignitions. An ignition advance then takes place in one step, which is also kept constant for a particular period of time or number of ignition events. Instead of this adjustment in steps, the ignition angle may also be influenced from one ignition event to the next. The computing cost for such a method is greater, however.

In FIG. 3, a first example of the ignition angle adjustment according to the present invention is shown. At time t1, a first knock event occurs again, as does an abrupt retardation of the ignition angle, as in FIG. 2. A second knock event occurs at time t2. Between these two, the ignition angle is again adjusted from the retard to the advance direction. The adjustment here takes place not with a constant step width and step height, however, but with a modified rate of step width. In comparison with FIG. 2, after time t1, a readjustment in the advance direction takes place much earlier. The width of the adjusting steps is then continuously increased, however; in particular in a region where the ignition angle has greatly advanced again (i.e., toward the knock limit), the chronological duration of the individual adjusting steps is greatly increased. The end effect is that time t2 is reached much later than in FIG. 2.

The ignition angle advance adjustment consequently takes place with a non-linear function, in particular a return in the advance direction takes place more quickly immediately after the knock event occurs, while the adjusting rate in the advance direction is significantly reduced with increasing distance from the knock event. The overall effect is that the engine, in comparison with FIG. 2, is again pushed faster toward the knock limit and, in spite of this, a knock event occurs only later. As a result, the efficiency of the internal combustion engine is improved since the engine is more quickly operated again close to the knock limit that optimizes consumption. At the same time, the number of knock events is also reduced, meaning that the load on the internal combustion engine due to knock events is reduced. Two advantages are thus achieved through the non-linear advance adjustment of the ignition angle. The important fact here is that increasing the advance adjustment of the ignition angle reduces the rate of the advance adjustment of the ignition angle.

FIG. 4 shows a further exemplary embodiment of the ignition angle adjustment according to the present invention. At times t1 and t2, knock events occur once again, and after the ignition angle retard adjustment at time t1, a non-linear advance adjustment of the ignition angle takes place again. In correspondence with FIGS. 2 and 3, the advance adjustment takes place incrementally again, in the course of which the step height and not the step width is varied. The first advance adjustment takes place with a step height significantly higher than that in FIG. 2. With increasing advance adjustment, the step height decreases, and only very small advance adjustments are allowed close to the knock limit, in particular. As the comparison of FIG. 4 with FIG. 2 shows, this results in time t2, at which a knock event occurs once again, being clearly pushed back. Furthermore, this comparison shows that the advance adjustment after time t1 takes place comparatively faster, meaning that the internal combustion engine is operated comparatively closer to the knock limit for optimal operation.

The methods described in FIGS. 2 and 3 are based on an incremental adjustment, in which after one adjustment no other adjustment takes place for multiple ignition events or for a certain period of time. This step-by-step adjustment is particularly easy to implement through corresponding counters or the like. A continuous adjustment would be a little more costly, but just as possible, the adjustment likewise having a non-linear course, in which increasing advance adjustment of the ignition angle reduces the rate of the adjustment.

The rate of adjustment may be easily influenced by the fact that the time is evaluated since time t1, i.e., the last time a knock event occurred. The further back this knock event occurred, the greater the rate of advance adjustment is reduced. This may also be implemented simply by counting the ignition events.

The usual methods for computing the ignition angle assume an ignition angle base portion and an ignition angle knock portion. In this case, the ignition angle base portion only depends on the operating parameters of the internal combustion engine, for instance the load and the rotational speed. An ignition angle knock portion, which is influenced by the knock events, is added to or deducted from this ignition angle base portion. Furthermore, this ignition angle knock portion may also depend on the rotational speed and load of the internal combustion engine.

Figure 5:
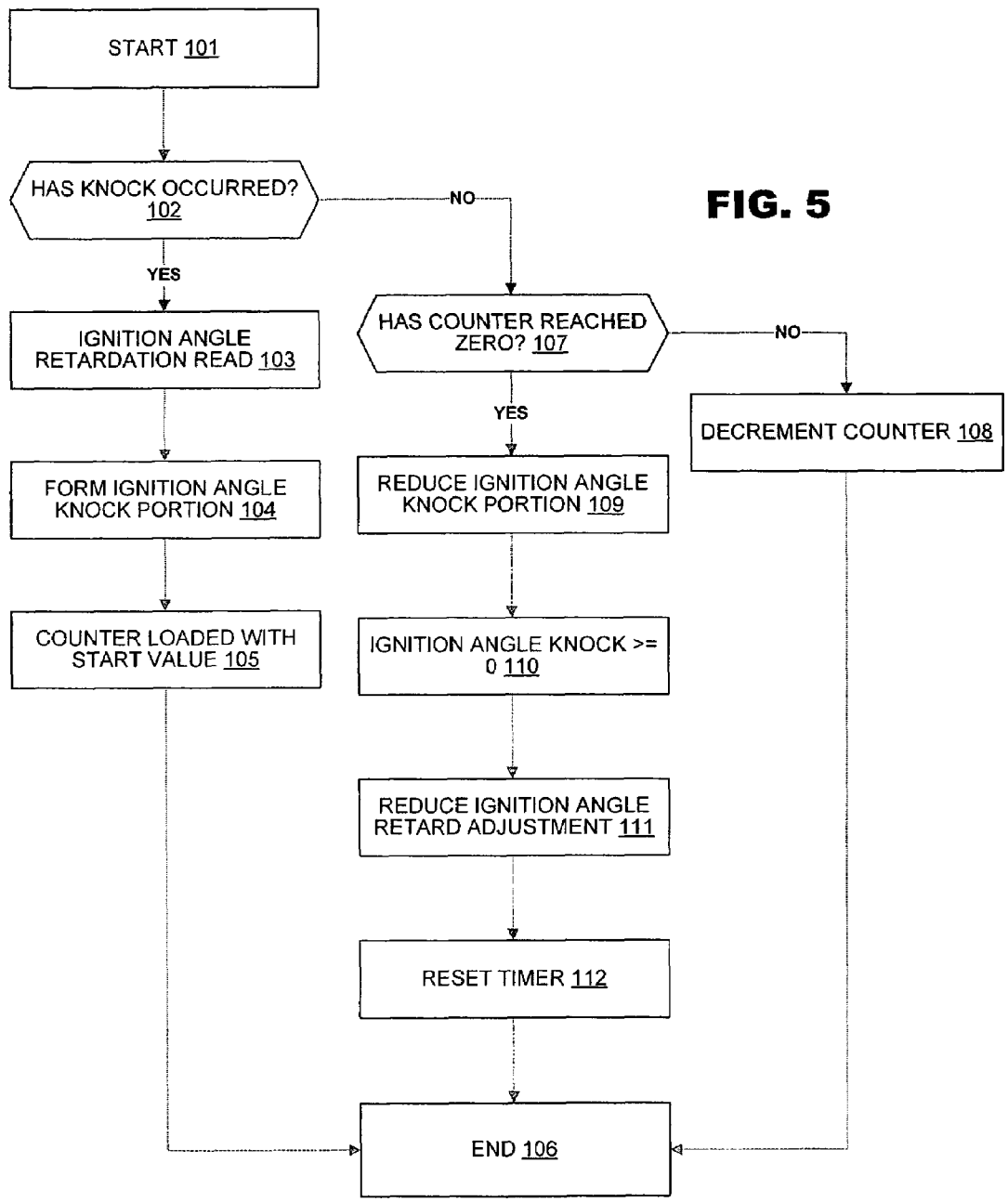
FIG. 5 shows the structure of a software for implementing the ignition angle adjustment according to the present invention.

A program is shown in FIG. 5 using a structogram, through which the method according to the present invention is implemented according to FIG. 3. After the start in step 101, it is verified in step 102 whether or not a knock event occurred. If a knock event occurred, step 103 follows step 102. In step 103, a value for an ignition angle retardation is read from a characteristic curve as a function of the rotational speed. In subsequent step 104, an ignition angle knock portion is formed, in which the value read in step 103 is added to the ignition angle knock portion of the last combustion (during which the knocking occurred). The actual ignition angle output by the ignition is made up of an (advanced) ignition angle base portion, to which an ignition angle knock portion (adjusting in the retard direction) is added. Through this procedure, the ignition angle knock portion specifies how far away the internal combustion engine is being operated from the optimum advanced ignition angle. By increasing this ignition angle knock portion in step 104, an adjustment of the output ignition angle toward retarded ignition takes place. In subsequent step 105, a counter or timer with a start value is loaded, which is read from a characteristic map as a function of the rotational speed and the value of the ignition angle retard adjustment from 103. This ensures that the start value of the timer or counter is set as a function of the rotational speed or the extent of the last ignition angle retard adjustment (=distance from the knock limit). The value determined in step 103 is stored since it is still needed in other program steps. The value determined in step 103 represents the distance from the current knock limit, i.e., if the conditions are otherwise unchanged, an advance adjustment by the value determined in step 103 would again result in knocking of the internal combustion engine. Following step 105 is step 106 at which the procedure is ended.

During the next ignition angle computation, the start step is again called, followed by step 102 in which it is verified whether or not knocking occurred. If knocking did not occur, step 107 follows step 102. In step 107, it is queried whether the counter or timer set in step 105 has already reached the value 0. If this is not the case, step 107 is followed by step 108, in which the value of the counter or timer is reduced. Step 108 is then followed by step 106, the end of the program. While running this program, the ignition angle knock portion consequently remains unchanged, meaning that the ignition angle (at a constant ignition angle base portion) is not changed. This corresponds to the horizontal portion of one of the adjusting steps, as shown in FIG. 3.

If it is established in step 107, however, that the counter or timer that was set in step 105 has expired, step 109 follows step 107. In step 109, the ignition angle knock portion is reduced by a certain amount corresponding to the step height of the steps in FIG. 3. In subsequent step 110, it is ensured that the ignition angle knock portion is not less than the value 0. Since the ignition angle base portion represents the optimum possible advanced ignition point, the ignition angle knock portion may not assume any negative values since the ignition angle would otherwise be advanced to an inadmissible extent. In step 111, the ignition angle retard adjustment from program step 103 is reduced. Step 111 is followed by step 112, in which the timer is reset as a function of the rotational speed and the currently valid value from 111 (=distance from the knock limit). This characteristic map is chosen such that with a decreasing ignition angle retard adjustment, the duration or number of ignitions increases in order to implement the increase in the step width, as shown in FIG. 3. It is achieved by slowing down the approach when nearing the ignition angle during which knocking occurred last. Step 112 is then followed again by step 106, i.e., the end of the program loop. In a renewed call, the timer or counter is again counted down in step 108 without knock events until the ignition angle is influenced further.

Alternatively to the above methods, other methods are also conceivable. These are characterized by taking into account the different variables for loading the timer in 105 or 112 for the particular increments until the next ignition angle advance adjustment of the ignition angle knock portion.

If the information on the current knock limit is present in a system, the difference between the knock limit and the current ignition angle retard adjustment may be directly computed here each time.

Alternatively, the entire ignition angle knock portion may also be taken into account.

In multi-cylinder engines, mean values of all the cylinders or cylinder groups may be used instead of individual cylinder values. However, the variable regulation for the individual cylinders is somewhat more imprecise in this case.

What is claimed is:

1. A device for knock control of an internal combustion engine, comprising:

an arrangement for retarding an ignition angle and afterwards advancing the ignition angle again, when a knock event occurs in the engine, wherein an increasing advance adjustment of the ignition angle is determined, and wherein a rate of the advance adjustment is reduced as a function of the increasing advance adjustment of the ignition angle.

2. The device according to claim 1, wherein a rate of ignition advance depends on how long ago a last knock event occurred.

3. The device according to claim 1, wherein a rate of ignition advance depends on a size of an interval between a current knock control retard adjustment and a knock limit.

4. The device according to claim 1, wherein the ignition angle depends on an ignition angle base portion and an ignition angle knock portion, and a rate of ignition advance depends on a size of the ignition angle knock portion.

5. The device according to claim 4, wherein at least one of the ignition angle base portion and the ignition angle knock portion continue to depend on a load and a rotational speed of the engine.

6. The device according to claim 1, wherein an adjustment takes place incrementally, and a step width is variable.

7. The device according to claim 1, wherein an adjustment takes place incrementally, and a height of steps is variable.

8. A method for controlling knock of an internal combustion engine, the method comprising:

when a knock event occurs in the engine, retarding an ignition angle and afterwards advancing the ignition angle again, wherein an increasing advance adjustment of the ignition angle is determined, and wherein a rate of the advance adjustment is reduced as a function of the increasing advance adjustment of the ignition angle.

* * * * *